(12) United States Patent
Kim

(10) Patent No.: US 7,794,871 B2
(45) Date of Patent: Sep. 14, 2010

(54) SECONDARY BATTERY AND SECONDARY BATTERY MODULE WITH THE SAME

(75) Inventor: Yong-Sam Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 399 days.

(21) Appl. No.: 11/229,363

(22) Filed: Sep. 16, 2005

(65) Prior Publication Data
US 2006/0063067 A1 Mar. 23, 2006

(30) Foreign Application Priority Data
Sep. 21, 2004 (KR) ................ 10-2004-0075403

(51) Int. Cl.
*H01M 2/02* (2006.01)
(52) U.S. Cl. .............. 429/159; 429/148; 429/156; 429/120; 429/176
(58) Field of Classification Search ............ 429/159, 429/148, 156, 120, 176
See application file for complete search history.

(56) References Cited

U.S. PATENT DOCUMENTS

| | | | | |
|---|---|---|---|---|
| 3,745,048 | A * | 7/1973 | Dinkler et al. | 429/120 |
| 5,510,203 | A * | 4/1996 | Hamada et al. | 429/53 |
| 6,033,800 | A * | 3/2000 | Ichiyanagi et al. | 429/176 |
| 6,365,297 | B1 | 4/2002 | Wolczak et al. | |
| 6,517,966 | B1 | 2/2003 | Marukawa et al. | |
| 7,291,423 | B2 | 11/2007 | Kajiya et al. | |
| 2002/0028375 | A1 | 3/2002 | Morishita et al. | |
| 2004/0247996 | A1 | 12/2004 | Smith et al. | |
| 2005/0181242 | A1 * | 8/2005 | Suzuki et al. | 429/7 |

FOREIGN PATENT DOCUMENTS

| | | |
|---|---|---|
| CN | 1291796 A | 4/2001 |
| CN | 1310484 A | 8/2001 |
| CN | 2570991 Y | 9/2003 |
| DE | 23 54 150 A1 | 5/1975 |
| JP | 8-321329 | 12/1996 |
| JP | 09-120809 | 5/1997 |
| JP | 10-106637 | 4/1998 |
| JP | 2000-251953 | 9/2000 |
| JP | 2000-357499 | 12/2000 |
| JP | 2001-229901 | 8/2001 |
| JP | 2001-283937 | 10/2001 |
| JP | 2004-047426 | 2/2004 |
| KR | 1998-025149 | 7/1998 |

(Continued)

OTHER PUBLICATIONS

Patent Abstract of Japan, Publication No. 08-321329, dated Dec. 3, 1996, in the name of Hideki Okajima et al.

(Continued)

*Primary Examiner*—Jane Rhee
(74) *Attorney, Agent, or Firm*—Christie, Parker & Hale, LLP

(57) ABSTRACT

A secondary battery includes an electrode assembly with a positive electrode, a negative electrode and a separator, and a case mounting the electrode assembly therein. The case has a plurality of channels adapted to form flow paths with channels of a neighboring secondary battery.

8 Claims, 7 Drawing Sheets

FOREIGN PATENT DOCUMENTS

KR          1998-053626          10/1998

OTHER PUBLICATIONS

Patent Abstract of Japan, Publication No. 2000-251953, dated Sep. 14, 2000, in the name of Mitsugi Takagi et al.

Patent Abstract of Japan, Publication No. 2000-357499, dated Dec. 26, 2000, in the name of Takashi Ito et al.

Korean Utility Model Abstracts, Publication No. 2019980053626, dated Oct. 7, 1998, in the name of Hyundai Motor Company.

U.S. Office action dated May 30, 2008, for related U.S. Appl. No. 11/390,609, noting listed U.S. references in this IDS, namely U.S. Patent 7,291,423 and U.S. Publicaiton 2004/0247996.

Patent Abstracts of Japan, Publication No. 2001-229901, dated Aug. 24, 2001, in the name of Toyohiko Eto.

Chinese Patent Publication CN 100502123 C, dated Jun. 17, 2009, for corresponding Chinese application 200610082067.X noting listed references in this IDS, as well as U.S. Patent 6,365,297 previously filed in an IDS dated May 20, 2009.

* cited by examiner

SECONDARY BATTERY AND SECONDARY BATTERY MODULE WITH THE SAME

CROSS-REFERENCE TO RELATED APPLICATION

This application claims priority to and the benefit of Korean Patent Application No. 10-2004-0075403 filed Sep. 21, 2004 in the Korean Intellectual Property Office, the entire content of which is incorporated herein by reference.

BACKGROUND OF THE INVENTION

1. Field of the Invention

The present invention relates to a secondary battery, and in particular, to a case for a secondary battery.

2. Description of Related Art

Secondary batteries, classified into low-capacity batteries and high-capacity batteries, are distinguished from the primary batteries in that secondary batteries are rechargeable. The low-capacity batteries are used as the power source for small portable electronic devices, such as cellular phones, laptop computers, and camcorders, whereas the high-capacity batteries are used as the power source for driving motors in hybrid electric vehicles and the like.

A secondary battery may be formed with various shapes, such as a cylindrical shape and a prismatic shape. In order to drive a motor for the electric vehicle requiring high electrical power, a plurality of high capacity secondary batteries are connected to each other to thereby form a battery module.

Because a battery module is constructed by interconnecting multiple secondary batteries, the heat generated at the respective secondary batteries should be dissipated well. Particularly when a battery module is used to drive a motor for an electronic washer, an electric scooter or a vehicle (an electric vehicle or a hybrid electric vehicle), it is important to have adequate heat dissipation.

If heat is not dissipated properly, the heat generated from secondary batteries causes overall temperature elevation of the battery module, and as a result, any equipment with the battery module may suffer device failure.

Particularly, as in the case of a battery module for a vehicle, the battery is charged and discharged by a high electric current, and the heat generated due to the internal reaction of the secondary batteries during usage may be elevated to a considerable degree. This severely affects the intrinsic characteristics of the batteries, and deteriorates their inherent capacity.

As the internal pressure of a secondary battery is increased due to the internal chemical reaction thereof, the shape of the battery may become skewed so as to affect the intrinsic characteristics thereof. The problem may be heightened particularly when the ratio of the width of the battery to the length becomes similar to that of a prismatic-shaped secondary battery.

Accordingly, conventional battery modules have a barrier wall disposed between neighboring secondary batteries to support the batteries and to create a gap for ventilating cool air. In this way, the secondary batteries are cooled, and their structural distortion is prevented.

However, with the addition of the barrier walls the secondary battery module has an enlarged volume which is not desirable since the battery module is installed within a confined area. Moreover, more processing steps are needed to form the barrier walls resulting in increased production cost and lowered price competitiveness.

SUMMARY OF THE INVENTION

A secondary battery is provided with enhanced heat dissipation efficiency without using separate battery barrier walls during the construction of a secondary battery module.

The secondary battery includes an electrode assembly with a positive electrode, a negative electrode and a separator, and a case for mounting the electrode assembly therein. The case has a plurality of channels forming flow paths when the channels on neighboring cases are aligned. The channels are formed by a concave portion and a pair of convex portions formed on the surface of the case. The concave and convex portions are formed by ribs spaced on the surface of the case and the ribs may be integral with the case in a body. A top surface of the rib has a flat shape. The ribs are arranged parallel to the longitudinal height of the case. The ribs have a trapezoidal longitudinal cross-sectional shape. The channels are symmetrically formed on the surfaces of the case placed opposite to each other. The case has a pair of opening portions arranged opposite to each other, and the case is formed through injection molding.

The secondary battery module includes a plurality of secondary batteries as described above. The neighboring secondary batteries are arranged such that the respective ribs of a first battery face the respective ribs of a second battery, and are adhered thereto. Alternatively, the neighboring secondary batteries may be arranged such that the respective ribs of one of the batteries are disposed between the respective ribs of the other battery, and are adhered thereto.

DETAILED DESCRIPTION

Figure 1:
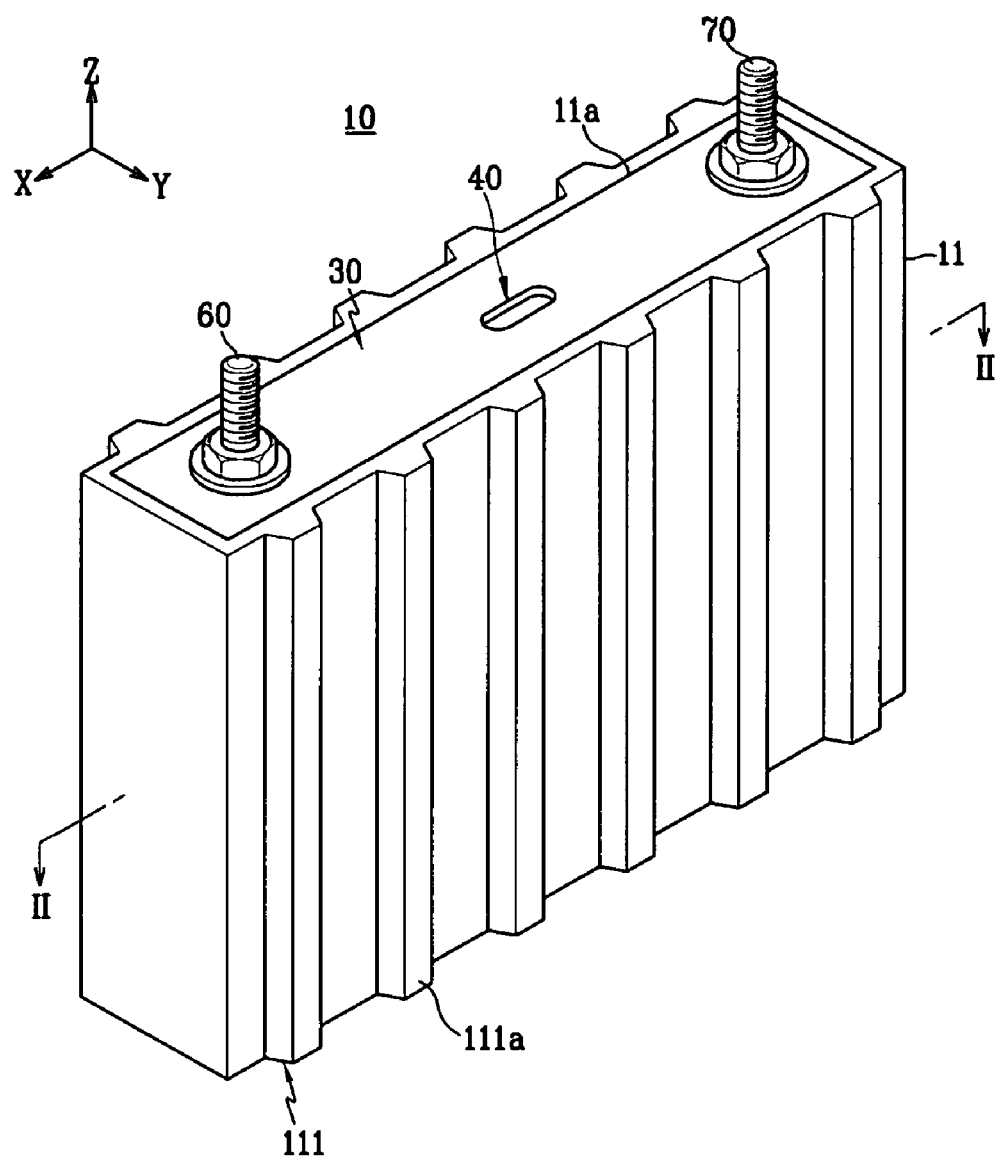
FIG. 1 is a perspective view of a secondary battery according to an exemplary embodiment of the present invention.
Figure 2:
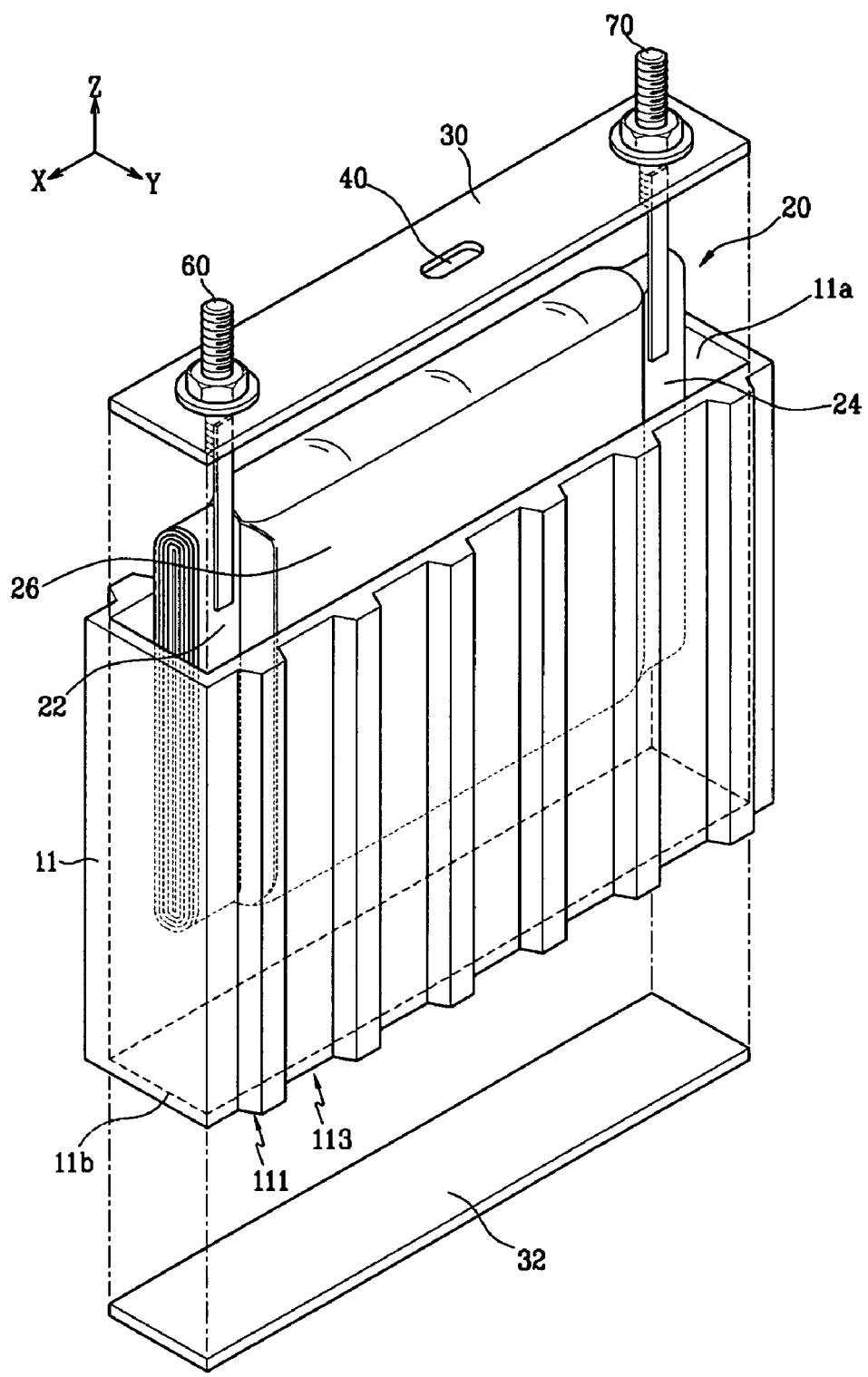
FIG. 2 is an exploded perspective view of the secondary battery according to the embodiment of FIG. 1.

With reference to FIGS. 1 and 2, a secondary battery according to an embodiment of the present invention includes an electrode assembly 20 mounted within a generally prismatic-shaped case 11 longitudinally proceeding in the vertical direction (in the direction of the Z axis of the drawing) and having ribs 111 thereon in a body, and an opening portion 11a of the case 11 sealed by a cap plate 30.

In this embodiment, the electrode assembly 20 is formed by interposing an insulating separator 26 between positive and negative electrodes 22, 24, winding them in the form of a jelly roll, and pressing them with a press into a prismatic shape.

The case 11 is formed with a conductive metallic material such as aluminum, aluminum alloy and nickel-plated steel, or a high-density molecular insulating material such as polyethylene, polypropylene and Teflon. The case 11 is generally prismatic-shaped with a first opening portion 11a through which the electrode assembly 20 is inserted into the case 11.

In this embodiment, the case 11 also has a second opening portion 11b opposite the first opening portion 11a.

A cap plate 30 with positive and negative electrode terminals 60, 70 electrically connected to the positive and the negative electrodes 22, 24 of the electrode assembly 20, respectively, is welded to the first opening portion 11a of the case 11. Furthermore, a separate bottom plate 32 is welded to the second opening portion 11b of the case 11.

The cap plate 30 and the bottom plate 32 are formed such that they correspond to the opening portions 11a, 11b. The positive and the negative electrode terminals 60, 70 are fitted to the cap plate 30 such that they protrude externally to the case 11 through opening portions (not shown) of the cap plate 30.

The cap plate 30 further has a vent 40 which is fracturable under a predetermined pressure to discharge gas in the case 11 to the outside, thereby preventing an explosion of the battery.

The case 11 further has a plurality of channels 113 adapted to allow coolant flow. The channels 113 may be made by concave and convex portions formed on the surface of the case 11.

Specifically, the channels 113 are formed in between neighboring ribs 111 spaced on the surface of the case 11. That is, the ribs 111 correspond to the convex portions, and the spaces between the ribs 111 correspond to the concave portions, thereby forming the channels 113.

As described above, the channels 113 are formed by ribs 111, but the channel formation structure is not limited thereto. The channels are not limited in shape provided that they allow coolant flow external to the case.

Figure 3:
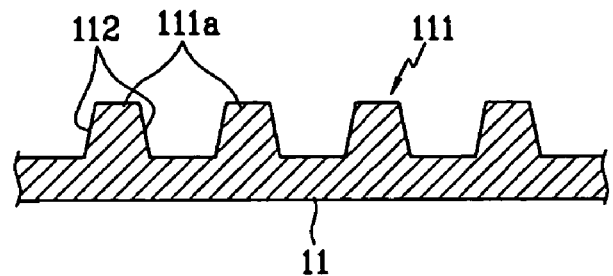
FIG. 3 is a partial sectional view of the secondary battery taken along the II-II line of FIG. 1.

In this embodiment, the ribs 111 are arranged longitudinally with respect to the case 11 (in the direction of the Z axis of the drawing) with a flat top surface 111a. As shown in FIG. 3, side walls 112 of the rib 111 taper toward a respective central longitudinal axis as they extend from the case 11 forming a trapezoidal sectional shape.

Figure 4A:
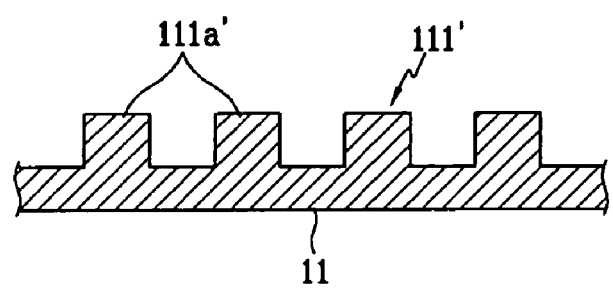
FIGS. 4A and 4B are sectional views of alternate rib embodiments.
Figure 4B:
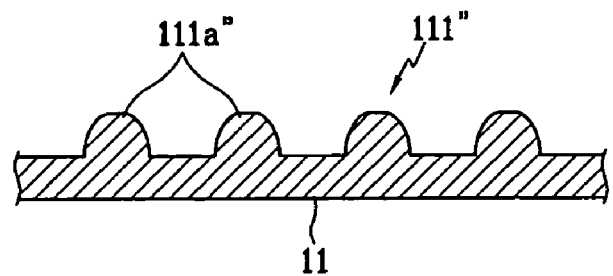

FIGS. 4A and 4B illustrate various cross-sectional shapes of the ribs. As shown in FIG. 4A, the ribs 111' may be formed with a generally rectangular sectional shape, or as shown in FIG. 4B, the ribs 111" may be formed with a generally semicircular shape.

With the variants, the respective ribs 111' and 111" have flat top surfaces 111a', 111a".

When a plurality of secondary batteries are arranged to form a secondary battery module, the ribs 111 may be selectively formed at an area where the neighboring secondary batteries contact each other.

Figure 5:
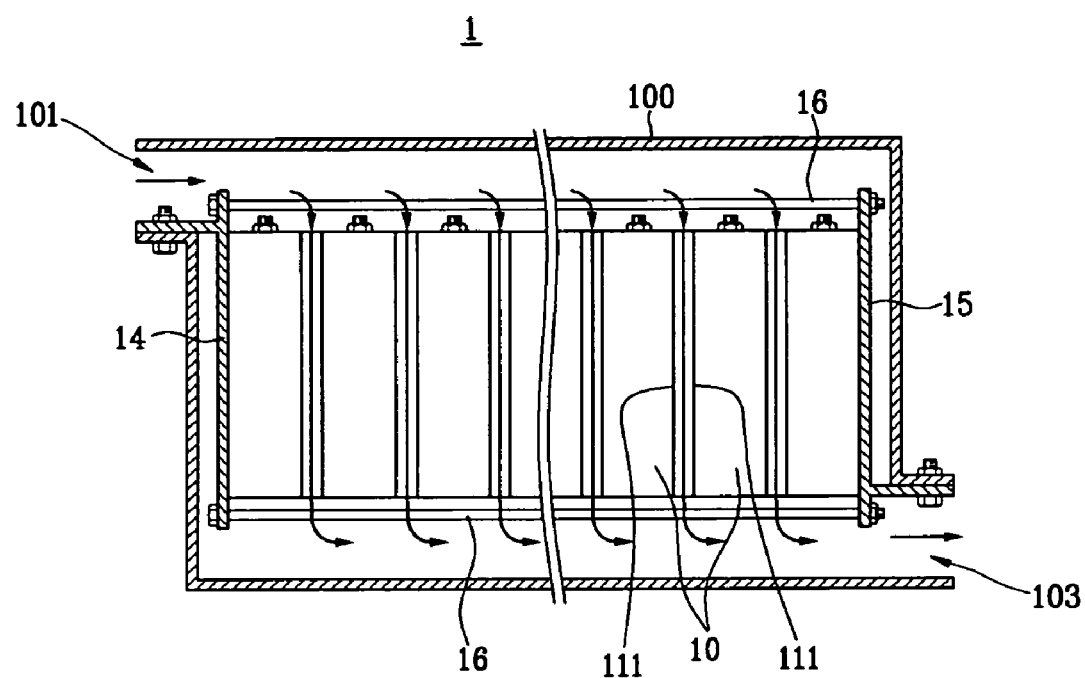
FIG. 5 is a schematic sectional view of a secondary battery module according to another exemplary embodiment of the present invention.

As shown in FIG. 5, when the secondary batteries 10 are formed into a secondary battery module, the secondary batteries are arranged parallel to each other, and hence, the ribs 111 are formed on the outer surfaces of the case 11 corresponding to the longitudinal sides thereof. Specifically, the ribs 111 are formed symmetrically on the outer surfaces of the case 11 placed opposite to each other.

With the secondary battery 10 according to the present embodiment, the case 11 may be formed by molding as well as by injection molding. The case 11 may be integral with the ribs 111 in a body.

The positive and the negative terminals 60, 70 are arranged at the cap plate 30 fitted to the upper opening portions 11a of the case 11. However, the positive and the negative terminals may be installed at the cap plate and the bottom plate fitted to the upper and the lower opening portions of the case, and electrically connected to the positive and the negative electrodes of the electrode assembly.

The secondary batteries 10 according to the present embodiment may be arranged as a secondary battery module 1 as shown in FIG. 5. This will be now explained in detail.

Figure 6:
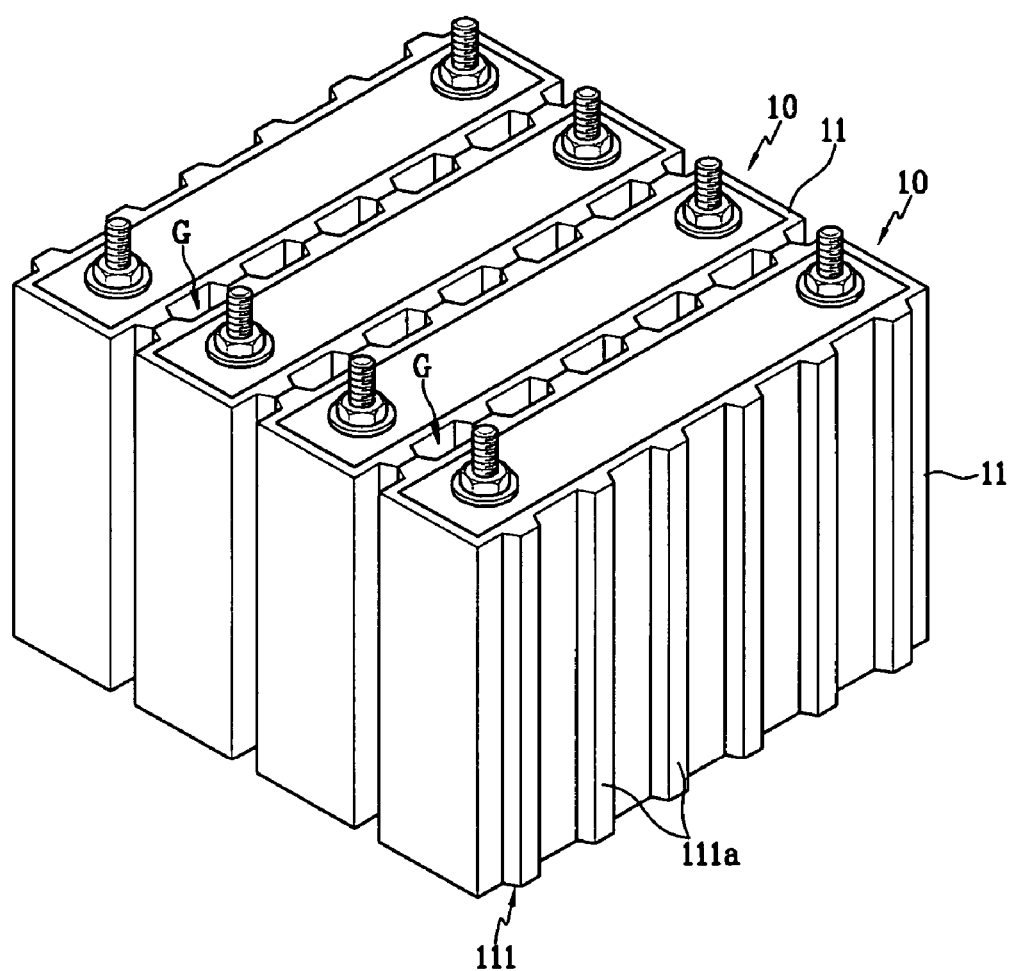
FIG. 6 is a partial perspective view of the secondary battery module according to an embodiment of the present invention illustrating the arrangement of secondary batteries.

As shown in FIGS. 5 and 6, a plurality of the secondary batteries 10 are connected to each other and mounted within a housing 100. The plurality of secondary batteries 10 are arranged in a line or in two lines, and end plates 14 and 15 are provided at both ends such that the end plates are adhered to the arrangement structure. The end plates 14, 15 are fitted to each other by way of coupling bars 16 coupled to the end plates by, for example, screws.

The plurality of secondary batteries 10 are fixedly mounted within the housing 100 by coupling the end plates 14, 15 to the housing 100.

The housing 100 has an inlet hole 101 on one side to allow introduction of coolant air for controlling the temperature of the secondary batteries 10, and an outlet hole 103 on an opposite side bottom to discharge the air passed through the secondary batteries 10. The structure of the housing 100 and the locations of the inlet and the outlet holes 101 and 103 are not limited to the above.

As shown in FIG. 6, the plurality of secondary batteries 10 contained within the housing 100 are arranged such that the ribs 111 of the neighboring secondary batteries 10 face each other. The ribs 111 of the respective secondary batteries 10 facing each other contact each other at the top ends 111a thereof, and in this state, the plurality of secondary batteries 10 abut each other.

Figure 7:
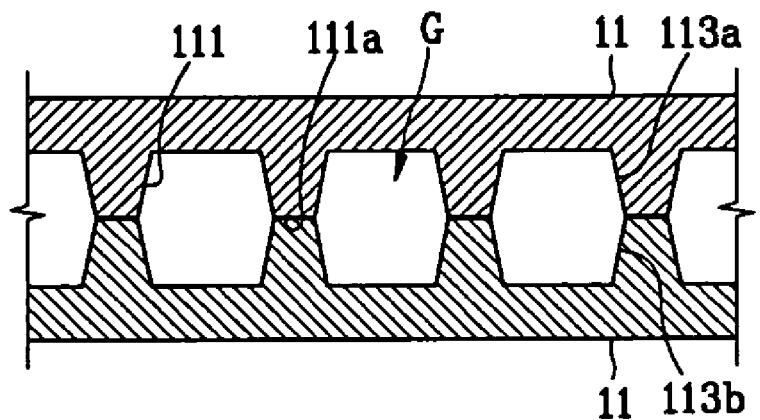
FIG. 7 is a partial sectional view of the arrangement structure of the secondary batteries shown in FIG. 6 illustrating a state where the neighboring secondary batteries are tightly adhered to each other.

As shown in FIG. 7, a flow path G is formed between neighboring secondary batteries 10 due to the neighboring channels 113a, 113b. The temperature controlling air introduced into the housing 100 via the inlet hole 101 of the housing 100 pass through the secondary batteries 10 via the flow path G, and is discharged via the outlet hole 103 of the housing 100, thereby cooling the secondary batteries 10.

As described above, when a secondary battery module is constructed by the ribs 111 formed on the outer surface of the cases 11 in a body, the flow path is formed sufficiently to pass the temperature controlling air without separately providing barrier walls between the neighboring secondary batteries.

Figure 8:
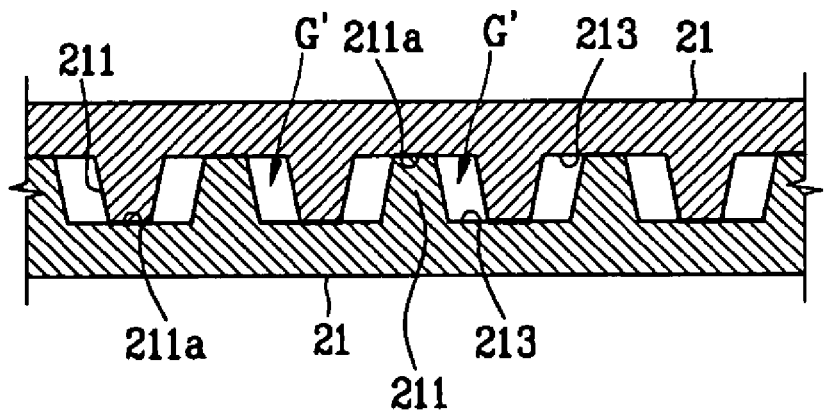
FIG. 8 is a partial sectional view of an alternate arrangement structure of secondary batteries illustrating a state where the neighboring secondary batteries are tightly adhered to each other.

FIG. 8 is a partial sectional view of a secondary battery module, illustrating an alternate arrangement structure of secondary batteries. With this structure, when the neighboring secondary batteries are tightly adhered to each other, the channels 213 formed at the cases 21 overlap each other forming flow paths G'. In order to make such a structure, the ribs 211 of a first secondary battery enter the channels 213 of a second neighboring secondary battery, allowing the front ends 211a of the first battery to be tightly adhered to the surface of the case 21 of the second battery.

Since the ribs 211 of a first secondary battery are alternately fitted into the channels 213 of the neighboring secondary battery, the secondary batteries are easily combined with each other to make the desired arrangement structure.

When the case of the secondary battery is formed with a conductive material, a nonconductor may be disposed between the batteries to prevent a short circuit when the ribs contact the cases.

Figure 9:
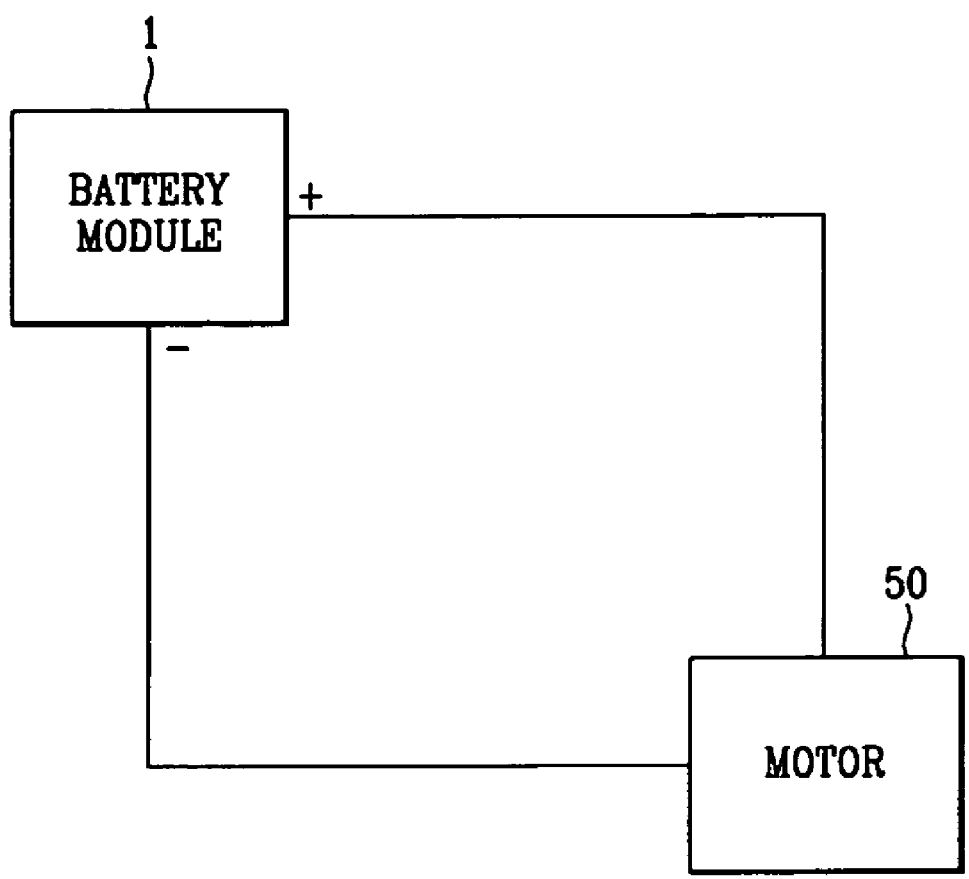
FIG. 9 is a schematic block diagram showing a secondary battery module driving a motor according to an embodiment of the present invention.

FIG. 9 is a schematic block diagram of a secondary battery module 1 as discussed in FIG. 5 driving a motor 50.

The secondary battery module according to the present invention is effectively used as the power source for driving motors in hybrid electric vehicles (HEV), electric vehicles (EV), wireless cleaners, electric bicycles, electric scooters and the like. Furthermore, the module may also be used to satisfy the high power/high capacity requirement.

As described above, the shape of the case for the secondary battery is improved so that the air ventilation structure may be simplified without separately installing barrier walls for ventilating the coolant air between the neighboring secondary batteries, and the volume of the battery module may be reduced due to the omission of the barrier walls.

Furthermore, the number of relevant processing steps and the number of product components are reduced to thereby lower the production cost of the secondary battery module.

Although exemplary embodiments of the present invention have been described in detail hereinabove, it should be understood that many variations and/or modifications of the basic inventive concept herein taught which may appear to those skilled in the art will still fall within the spirit and scope of the present invention, as defined in the appended claims.

What is claimed is:

1. A secondary battery module comprising:
a plurality of secondary batteries each having an electrode assembly with a positive electrode, a negative electrode and a separator, a case for housing the electrode assembly, and a plurality of channels on the case for channeling a coolant; each of the plurality of channels having a substantially flat base and ribs extending from opposite sides of the substantially flat base, each rib terminating in a substantially flat top surface,
wherein the substantially flat top surface of each rib of a first secondary battery of the plurality of secondary batteries is attached to the flat base of one of the plurality of channels of a second secondary battery of the plurality of secondary batteries adjacent to the first secondary battery to form a flow path having a substantially constant cross-sectional size along an entire length of the flow path;
a housing for the plurality of secondary batteries, the housing comprising side walls; and
a first end plate and a second end plate at respective side ends of the plurality of secondary batteries, wherein all of the plurality of secondary batteries in the secondary battery module are between the first end plate and the second end plate, the first end plate and the second end plate adapted to attach the plurality of secondary batteries to the housing, wherein the first end plate and the second end plate are attached to each other by a coupling bar, and wherein the first end plate and the second end plate are spaced from the side walls of the housing.

2. The secondary battery module of claim 1, wherein the plurality of channels are on opposite external sides of the case of each of the plurality of secondary batteries.

3. The secondary battery module of claim 1, wherein the ribs are integral with the case.

4. The secondary battery module of claim 1, wherein each rib has a generally trapezoidal cross-section.

5. The secondary battery module of claim 1, wherein the flow path is formed on either side of at least one of the ribs.

6. The secondary battery module of claim 1, wherein the case has a pair of opening portions at ends of the case along a case height direction.

7. The secondary battery module of claim 1, wherein the case is formed by injection molding.

8. The secondary battery module of claim 1, wherein the housing comprises an inlet on one side adapted to allow introduction of a coolant and an outlet on another side adapted to allow discharge of the coolant.

* * * * *